(12) United States Patent
Bertolotti et al.

(10) Patent No.: US 6,620,259 B1
(45) Date of Patent: Sep. 16, 2003

(54) METHOD FOR CLEANING CONTAINMENT ENCLOSURES WITH DOUBLE CONTAINMENT AND A REMOVABLE CLEANING RECEPTACLE

(75) Inventors: Gérard Bertolotti, Montreuil (FR); Bernard Defontaine, Maurepas (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 83 days.

(21) Appl. No.: 09/627,099

(22) Filed: Jul. 27, 2000

(30) Foreign Application Priority Data

Jul. 30, 1999  (FR) .............................. 99 09908

(51) Int. Cl.[7] .............................. B08B 5/04; B08B 9/00
(52) U.S. Cl. .......................... 134/21; 134/22.1; 134/24
(58) Field of Search .......................... 134/10, 21, 22.1, 134/24; 15/327.1

(56) References Cited

U.S. PATENT DOCUMENTS 4,662,912 A    5/1987  Perkins 5,417,729 A    5/1995  Greenleaf, Sr.

FOREIGN PATENT DOCUMENTS

| DE | 8 33 000 A1 | 11/1989 | ............ F16L/55/10 |
| DE | 195 23 549 A1 | 5/1996 | ............. B08B/9/04 |
| EP | 0 493 282 A1 | 12/1991 | ............. B60S/3/00 |
| GB | 1 435 279 | 5/1976 | ............. A47L/5/18 |
| GB | 2 140 155 A | 11/1984 | ............ B08B/15/00 |
| GB | 2 167 681 A | 6/1986 | |

OTHER PUBLICATIONS

Preliminary Search Report dated Apr. 19, 2000 (in French).

British Search Report dated Mar. 6, 2001, 1 pg.

Primary Examiner—Zeinab El-Arini
(74) Attorney, Agent, or Firm—Cohen, Pontani, Lieberman & Pavane

(57) ABSTRACT

The present invention relates to a method for cleaning containment enclosures, and in particular for dedusting them. The invention is implemented with double containment; and suctioning is performed within a removable receptacle.

4 Claims, 2 Drawing Sheets

METHOD FOR CLEANING CONTAINMENT ENCLOSURES WITH DOUBLE CONTAINMENT AND A REMOVABLE CLEANING RECEPTACLE

PRIORITY CLAIM

Priority is claimed from patent application No. 99/09908 filed in France on Jul. 30, 1999.

The present invention relates to a method and a device for cleaning containment enclosures, in particular for dedusting them.

BACKGROUND OF THE INVENTION

In various industries, and in particular in the nuclear industry, there exist containment enclosures which enclose hazardous materials, so that it is essential to ensure the atmosphere remains confined. Various manipulations are performed during which it is essential to protect the people performing the manipulations within such enclosures. The enclosures are generally provided with at least one standard opening that is designed in particular for transferring contaminated materials, tools, and various kinds of waste. Such enclosures are often maintained at a pressure below ambient and they are always ventilated. In spite of such ventilation, they generally become polluted in use by solids (in particular powders) and/or by liquids, and this can happen progressively or suddenly, e.g. in the event of an exceptional operation. It then becomes necessary to evacuate such solids and/or liquids from said enclosures.

To implement such evacuation without breaking containment, a first variant of the practice recommended and/or used at present is as follows: known, relatively complex and expensive suction devices are secured to said enclosures; such enclosure is thus from the beginning and throughout its use fitted with such a suction device a second variant is as follows: suction devices are inserted inside said enclosures and they remain therein, so that in the long run they end up themselves as constituting waste to be evacuated and treated.

OBJECTS AND SUMMARY OF THE INVENTION

According to the invention, it has been found that it is possible to make such operations of cleaning containment enclosures much more flexible by making use of a removable suction device, and that this can be done while always maintaining double containment.

The method and the device of the invention have been designed on these lines.

In a first aspect, the present invention thus provides a method of dedusting a containment enclosure provided with at least one standard opening closed by a retractable closure device with appropriate suction means. In this respect, the method of the invention is of the same type as prior art cleaning methods. In a manner characteristic of the method of the invention, the suction means operates in a removable receptacle suitable for docking on and for undocking from said standard opening of said containment enclosure.

According to the invention, a removable suction device (constituted by suction means arranged in a suitable receptacle) is used that is suitable for docking on and for undocking from at least one of the standard openings, while maintaining double containment. A single device of this type can be used for cleaning a plurality of enclosures. Such a device can itself be cleaned in a suitable station between two successive uses.

The method of the invention is advantageously implemented using the double-door sealed transfer technique familiar to the person skilled in the art, and comprises:

taking a receptacle closed by a retractable cover having an outside face and temporarily docking it in a leakproof manner onto a closed standard opening having an outside face with dimensions substantially the same as those of the retractable cover, the receptacle being docked by aligning the outside face of the cover with the outside face of the receptacle, the outside faces of the cover and of the standard opening thus coming into contact, the receptacle also including suitable suction means having a free suction endpiece closed by a removable plug;

securing the cover of the docked receptacle to the closure device of the standard opening so as to constitute an assembly;

retracting the assembly into the inside of the containment enclosure so as to put the inside of the enclosure into communication with the inside of the docked receptacle;

retracting the removable plug so as to release the free suction endpiece of the suction means;

establishing suction by actuating the suction means, and subsequently stopping the suction by deactuating said means;

closing the free suction endpiece by means of the plug;

closing in leakproof manner both the enclosure and the receptacle by putting the assembly back into place and separating the cover and the closure device making up the assembly; and undocking the closed receptacle from the closed standard opening.

In general, in order to implement the method of the invention, it is naturally necessary to have available an appropriate removable suction device, and in particular one which is easily transported and handled (manually or using appropriate machinery).

In a second aspect, the present invention provides such a device. In characteristic manner, it comprises suction means including a free suction endpiece closed by a removable plug, and contained in a receptacle having a closed end wall and a front face provided both with means enabling it to be docked temporarily and in leakproof manner on a standard opening of a containment enclosure closed by a retractable closure device, and with a retractable cover suitable for being secured to the retractable closure device of the enclosure, the retractable cover and the retractable closure device having outside faces of the same size in contact with each others.

The device thus includes the means which act in succession to perform both static double containment and combined static and dynamic double containment.

In a variant that is particularly preferred for dedusting, the suction means are disposed within said removable receptacle and extending from its front face towards its end wall:

a suction tube whose free endpiece is closed by a removable plug;

an impact filter into which the suction tube opens out and beneath which there is placed a collector pot;

a filter stage for filtering the atmosphere coming from the containment enclosure via the impact filter; and a suction turbine sucking in the atmosphere coming from said containment enclosure via said impact filter and the filter stage, and expelling it into the inside of the receptacle. While cleaning is taking place, the turbine is responsible for sucking in a polluted atmosphere and recycling the atmosphere once "unpolluted" into the receptacle and then back into the enclosure. The return flow of the "unpolluted" atmosphere from the receptacle to the enclosure prevents polluted atmosphere entering the receptacle from said enclosure.

The suction means advantageously further comprise a hose suitable for being secured to the free endpiece of the suction tube and suitable for penetrating into the inside of the enclosure to be cleaned. As stated above, such a hose can be provided inside the removable receptacle or inside the enclosure.

Whatever the variant concerned, the suction means are advantageously arranged inside the receptacle on a slider device. Such an arrangement enables the suction means to be extracted conveniently from said receptacle for cleaning purposes.

BRIEF DESCRIPTION OF THE DRAWINGS

The invention is described below, mainly in its device aspect, with reference to accompanying FIGS. 1 and 2.

DESCRIPTION OF THE PRESENTLY PREFERRED EMBODIMENTS

Figure 1:
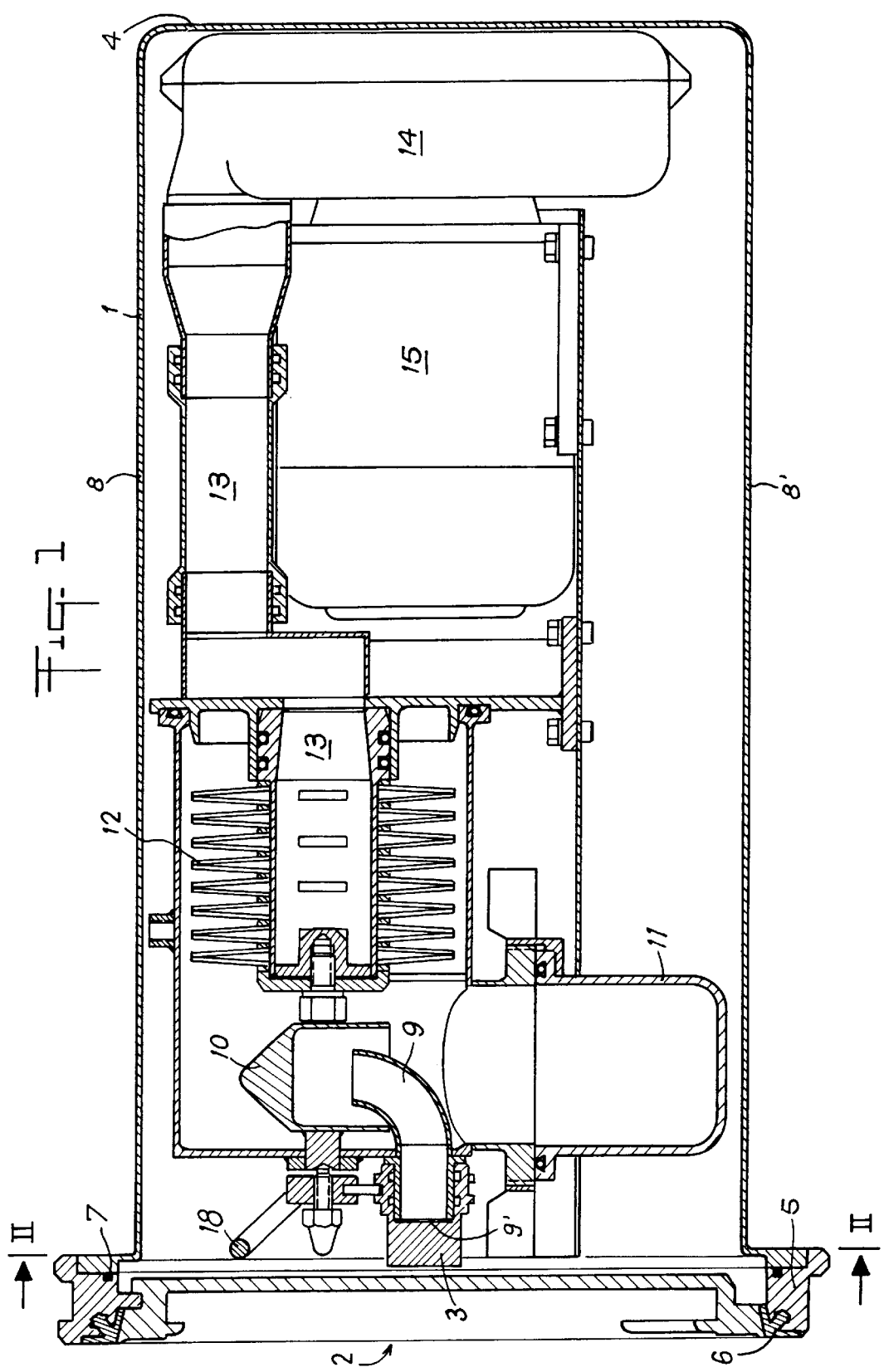
FIG. 1 is a longitudinal section view of a removable suction device of the invention.

The device shown is suitable for dedusting.

FIG. 1 and 2 show:

A cylindrical body of a receptacle 1, having a closed end wall 4 and a front face including means (clamp 5, gaskets 6, 7) which enable receptacle 1 to be fixed in a leakproof manner on a standard opening of a containment enclosure. The front face of receptacle 1 is closed by a retractable cover 2. Cover 2 can be retracted once it has been secured to the retractable closure device of the standard opening of the enclosure for cleaning (the double-door sealed transfer technique, also known as a Calhène trash can).

A removable plug 3 suitable for enabling the suction means arranged in receptacle 1 is used. Plug 3 closes free endpiece 9' of suction tube 9. Suction tube 9 is suitable for coupling to a hose to enable dust to be sucked up effectively from various points within the enclosure to be cleaned.

Figure 2:
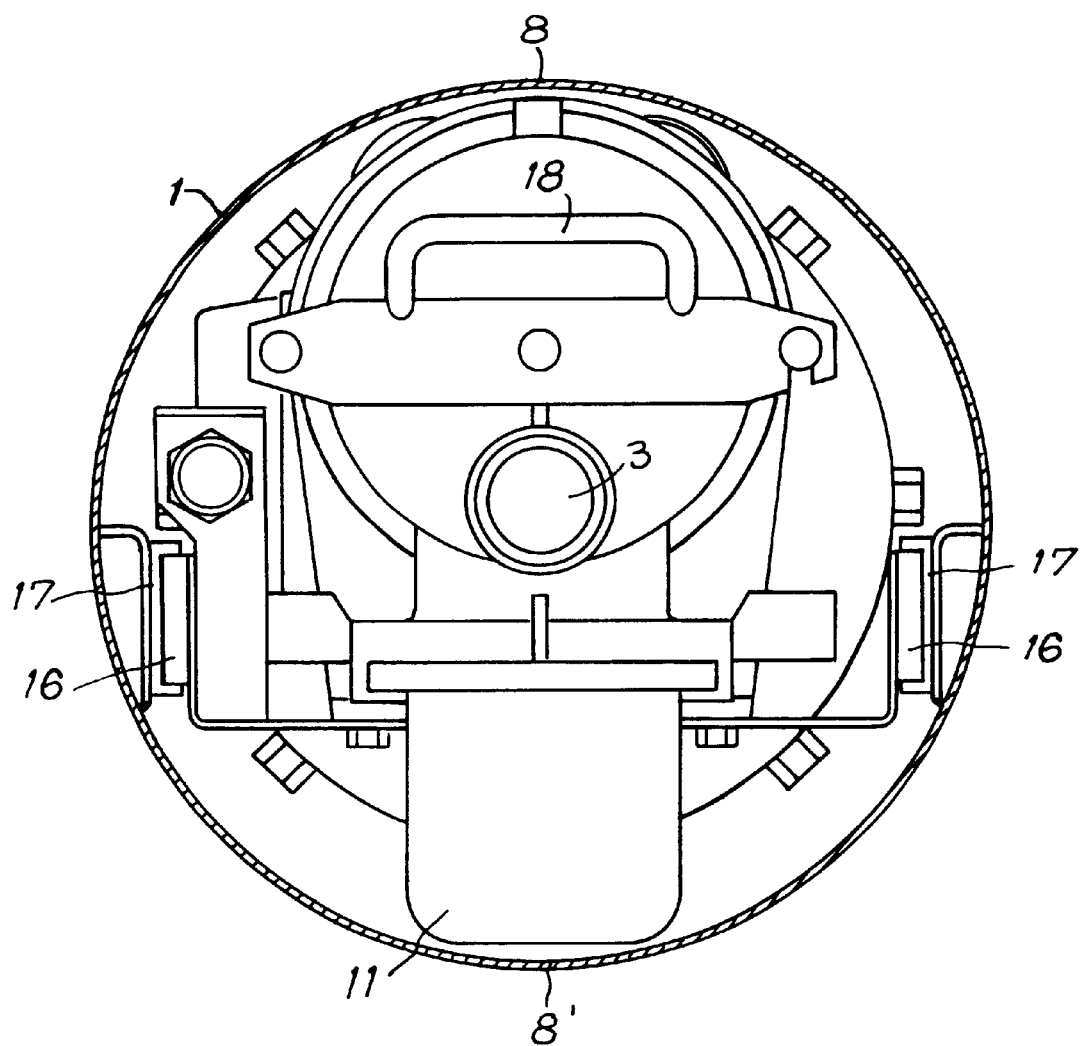
FIG. 2 is a cross-section along lines II—II of the device of FIG. 1.

Suction tube 9 has an upward bend towards the top portion 8 of receptacle 1 and opening out into a bell 10, thereby providing an impact trap or collector pot 11. The dust striking the inside face of bell 10 drops into collector pot 11 positioned therebeneath. The brief description above of suction tube 9 being bent upwardly and of the operation of the impact filter with dust being received in the collector pot naturally implies that the device of the invention must be operated in a particular orientation i.e. it must have a top portion and a bottom portion; in FIGS. 1 and 2, the top portion is referenced 8 and the bottom portion 8'. At this point, it is mentioned that insofar as the device of the invention is advantageously easy to handle by a single person, whether manually or by means of an appropriate hoist, it is generally appropriate to place some kind of suspension means at the top thereof (not shown in FIGS. 1 and 2), e.g. a handle.

A filter 12 comprises a series of sintered metal disks. The porosity of filter 12 is naturally matched both to the suction established by a suction turbine 14 (see below) and to the grain size of the particles to be stopped by filter 12. Experience shows that as a general rule at least 95% of the dust that is entrained by suction tube 9 is stopped by bell 10 and falls into impact trap 11 (with impact trap 11 possibly being specifically adapted to achieve that result), such that filter 12 need stop no more than 5% of said dust; as a result, said filter 12 does not need to be changed often.

In operation, the air passing through filter 12 is sucked via a pipe 13 into a suction turbine 14 which is driven by a motor 15. The air leaving turbine 14 is returned to receptacle 1 and vents into the enclosure that is being cleaned. As a general rule, reference to the "air" refers to the atmosphere of the containment enclosure that is being cleaned.

The above-described suction means are placed on two sliders 16 which slide in rails 17 secured to the interior wall of receptacle 1. This configuration enable all or some of the means of the device of the invention to be extracted from receptacle 1 for cleaning purposes and once disassembled using optional remote handling, enables [the] collector pot 11 and filter 12 to be changed. The assembly on sliders 16 can be handled by means of the handle 18.

The following applies, by way of example.

The turbine 14 can operate at a flow rate of at least 20 m$^3$/h with suction of 50 mbars.

A device of the invention as described above weighs 20 kg to 35 kg depending on the precise nature of its component elements. It is easily manipulated by hand, so as to be connected to the enclosures and then disconnected therefrom, and so as to be transported so that it can itself be subjected to appropriate cleaning. Given the very large number of enclosures in need of dedusting by means of said device, it would appear that such a device makes it possible to achieve savings that are considerable.

What is claimed is:

1. A method of cleaning a containment enclosure provided with at least one standard opening closed by a retractable closure device, and also provided with a suction means having a free suction endpiece associated with a filtration means and being closable by a removable plug, said suction means and said filtration means being arranged inside a removable receptacle adapted to removably dock onto said standard opening of said containment enclosure, said removable receptacle having an opening dimensioned to mate with said standard opening of said retractable closure device and being closed by a retractable cover, said method comprising:

removably docking, in a leakproof manner, said removable receptacle, while closed by its retractable cover, onto said closed standard opting of said enclosure, said receptacle being docked by coupling said opening thereof to said at least one standard opening, said cover and said closure device of said standard opening thus coming into contact and said free suction endpiece being closed by said removable plug;

securing said removable cover to said retractable closure device of said standard opening, thereby constituting an assembly;

retracting said assembly into the inside of said containment enclosure, thereby placing the inside of said enclosure into fluid communication with the inside of said receptacle;

retracting said removable plug so as to open said free suction endpiece of said suction means;

actuating said suction means to draw an atmosphere from said enclosure;

filtering said atmosphere drawn by said suction means through said filtration means;

delivering said atmosphere to said removable receptacle;

recycling said atmosphere in said enclosure;

stopping said suction by deactuating said suction means;

closing said free suction endpiece by means of said retractable plug;

closing in a leakproof manner both said enclosure and said receptacle by removing said assembly from said interior of said enclosure and separating said cover and said means for closing, thereby deconstituting said assembly; and undocking said closed receptacle from said closed standard opening;

wherein said method of cleaning is performed under double containment.

2. The method according to claim 1, wherein said suction is implemented via a hose adapted to penetrate into the inside of said enclosure; said hose being secured to said free suction endpiece.

3. The method according to claim 1, further comprising cleaning the suction means of the receptacle while undocked, by removing accumulated dust therefrom.

4. The method of claim 1, wherein said drawn atmosphere contains solid contaminants, and said filtering of said drawn atmosphere removes said solid contaminants from said drawn atmosphere.

* * * * *